Figure 5:
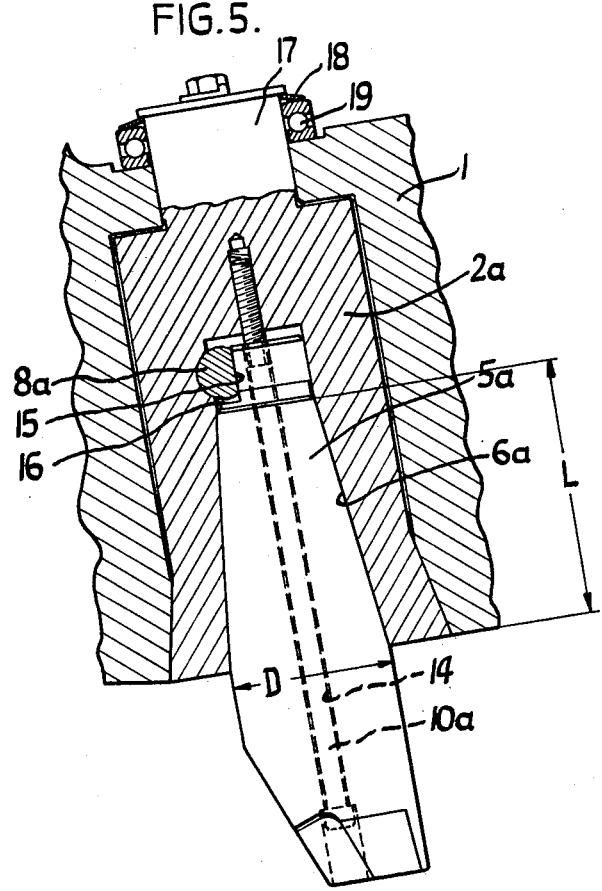

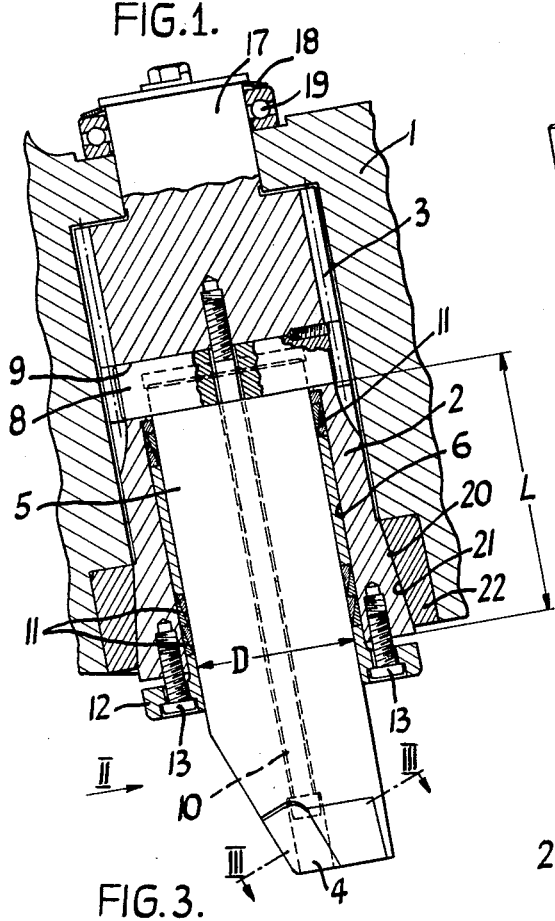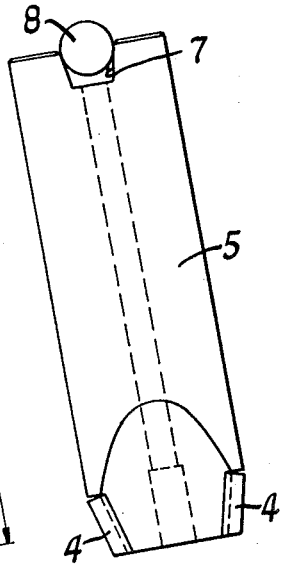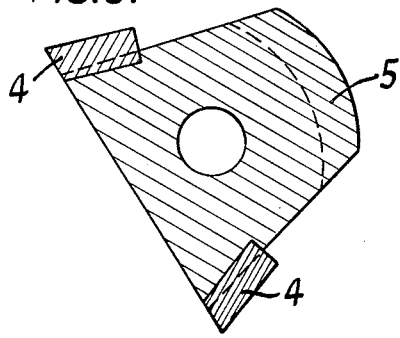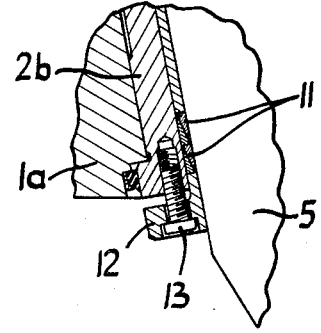

Dec. 29, 1964     H. LANGE     3,163,088
TOOL MOUNTING ARRANGEMENT FOR FORWARD AND REARWARD PLANING
Filed April 8, 1963     2 Sheets-Sheet 2

INVENTOR.
HEINZ LANGE
BY
ATTORNEYS

United States Patent Office 3,163,088
Patented Dec. 29, 1964

3,163,088
TOOL MOUNTING ARRANGEMENT FOR FORWARD AND REARWARD PLANING
Heinz Lange, Birkenfeld, Germany, assignor to Werkzeugmaschinenfabrik Adolf Waldrich, a corporation of Germany
Filed Apr. 8, 1963, Ser. No. 271,142
Claims priority, application Germany, Apr. 9, 1962, W 32,002
12 Claims. (Cl. 90—53)

The invention relates to a tool mounting arrangement for forward and rearward planing, comprising a tool which has two identical cutting edges and which is inserted in a tool head mounted in a tool carrier, the said tool head being pivotable through a limited angular range.

In a known tool mounting arrangement of this kind, the tool head consists of a substantially cylindrical part which at its lower end has a recess for accommodating the tool. The tool which is of relatively small construction, consists entirely of a suitable tool steel. It has a triangular or trapezoidal cross-section. The recess in the tool head is appropriately shaped. By means of a pressure screw arranged perpendicularly to the tool, the said tool is pressed into the recess in the tool head. In order to save expense, the tool is of relatively small size since it is made entirely of expensive tool steel. The small size of the tool, however, has the disadvantage that the dissipation of heat is unsatisfactory. When planing forwards and rearwards, material is removed both at the forward stroke and also at the rearward stroke of the machine. Thus the tool no longer has the possibility of cooling at the rearward stroke as is the case with hitherto conventional machines which remove material only at the forward stroke. Since adequate dissipation of heat by the tool or its mounting arrangement is not possible, the hitherto known arrangement requires additional cooling means. But this requires additional constructional outlay and in many cases encounters further difficulties. Owing to the considerable heat which is produced and the poor dissipation of heat, it has also hitherto not been possible to use tools which were provided only with small hard metal tips, since owing to the considerable heat which is developed the brazed hard metal tips are loosened. A further disadvantage of the hitherto known triangular or trapezoidal steel tools resides in their expensive manufacture.

In order to obviate the disadvantages of the known tool mounting arrangements for forward and rearward planing, according to the present invention the tool comprises a steel shank which at its lower end has two identical cutting tips and is circular and relatively large in diameter, and the tool head is constructed as a cylindrical bearing sleeve into which the tool shank is inserted with the largest possible bearing surface. The steel shank with its relatively large diameter permits heat to be dissipated rapidly, owing to its large surface area. Since it is inserted with the largest possible bearing surface in the bearing sleeve, the heat which occurs is dissipated through the bearing sleeve to the surrounding tool holder. The steel shank with its relatively large diameter also has greater stability than the small steel tools which have been used hitherto. It is cheap to manufacture, since it has a circular cross-section and simply carries two cutting tips made of hard metal or the like at its lower end. These hard metal tips can be brazed on to the tool shank without there being any risk that the brazed connection will be released when great heat is produced. The advantageous dissipation of heat also results in reduced wear on the tool and therefore gives the tool a longer life.

Owing to the good dissipation of heat, it is not necessary to cool the tool.

Embodiments of the invention will now be described by way of example with reference to the accompanying drawings, in which:

FIG. 1 is a longitudinal sectional view through the new tool mounting arrangement, FIG. 2 is a view of the tool in the direction II of FIG. 1, FIG. 3 is a sectional view through the tool on the line III—III of FIG. 1, FIG. 4 is a part sectional view of the lower radial bearing of the bearing sleeve in a second embodiment, and FIG. 5 is a longitudinal sectional view of a further embodiment.

In the drawings, 1 designates the tool holder of a planing machine or the like, in which a tool head 2 is provided which is angularly pivoted to a limited extent in the tool holder. For carrying out the pivoting movement, this tool head can be provided with a toothing 3 which co-operates with a suitable rack. In this embodiment, the tool head 2 is constructed as a cylindrical bearing sleeve. The tool is inserted into this cylindrical bearing sleeve and consists of a steel shank 5 which carries at its lower end two identical cutting tips 4 and is of circular shape with a relatively large diameter D. As FIG. 1 also shows, the steel shank 5 is supported with a relatively large bearing surface in the sleeve 2.

Also provided advantageously in the bearing sleeve and on the tool shank are inter-engaging adjusting means with which the angular setting of the shank 5 relatively to the sleeve 2 is fixed. In the embodiment shown in FIG. 1, the bearing sleeve 2 is closed at its upper end and the cylindrical tool shank 5 is inserted into the blind hole 6 formed thereby. The end face of the tool shank 5, as FIG. 2 shows, is formed with a recess 7 for engaging with an adjusting pin 8 provided in the bottom of the blind hole 6. The adjusting pin 8 is advantageously arranged in a transverse bore 9 of the bearing sleeve 2. As FIG. 2 shows, the recess 7 advantageously consists of a trapezium-shaped groove extending perpendicularly to the axis of the steel shank 5. In order that the tool shank 5 is pressed securely against the adjusting pin 8 at the time of assembly, eliminating any play, there is also provided a tie bolt 10 which extends through the tool shank 5 and is screwed into the bearing sleeve 2.

In order to clamp fast the tool shank 5 without any play in the bearing sleeve 2, conical clamping spring rings 11 are arranged at the periphery of the tool shank and at the lower end of the bearing sleeve there is provided a clamping ring 12 which acts in the axial direction on the clamping spring rings 11 and can be tightened or released by means of screws 13. The conical clamping spring rings permit of quick and play-free mounting and demounting of the tool. It is also possible for the tool to be inserted in such a manner as to obtain a working position offset by 180°, so that the effective hard metal cutting edges are not situated, as in FIG. 1, at the left-hand side but instead at the right-hand side and can perform cutting operations there.

In the examples of embodiment shown in FIGS. 1 to 4, the tool shank 5 has a cylindrical cross-section. However, as shown in FIG. 5, it can also have a cross-section in the manner of a steep-angle cone tapering towards its upper end in conical fashion. This conically shaped tool shank 5a is arranged in an appropriate, conically shaped bore 6a in the bearing sleeve 2a. Also provided is a clamping bolt 10a which extends through a longitudinal bore 14 in the shank and is screwed into the bearing sleeve 2a. With the help of this clamping bolt, the conical tool shank 5a can be clamped fast in the conical bore 6a in the bearing sleeve 2a. This arrangement also ensures play-free mounting of the tool shank.

In order that the tool shank can be given a predetermined angular position with respect to the bearing sleeve at all times, there is provided in the bearing sleeve an adjusting pin 8a which is provided with a flat 15 in the axial direction of the bearing sleeve. This flat 15 engages in an appropriate recess 16 in the tool shank 5a.

As FIGS. 1, 4 and 5 show, the bearing sleeve 2, 2a or 2b is mounted at its lower end with a radial bearing in the tool holder 1 or 1a. At its upper end, it has a cylindrical stud 17 mounted in the tool holder, a spring being provided which exerts a continual upward pressure on the bearing sleeve, so that its axial play is taken up. Advantageously, a cup spring 18 is provided for this purpose, the said spring bearing on an axial ball bearing 19 arranged on the bearing stud. The axial ball bearing in its turn bears on the tool holder 1. The spring 18 is expediently so dimensioned that its spring force slightly exceeds the weight of the bearing sleeve including the tool. Even when removing very little material i.e. when the cutting pressure is not sufficient to press the tool and bearing sleeve upwards, the said sleeve is pressed against its upper seat as a result of the spring force, so that its axial play is compensated for.

Advantageously, the radial bearing provided at the lower end of the bearing sleeve is conically shaped. For this purpose, the bearing sleeve 2 has an upwardly tapering bearing cone 20 which is mounted in an appropriate, conical seat 21 of the tool holder. This conical seat can be inserted as a ring 22 in the tool holder 1. However, it may also be arranged directly in the tool holder. The action of the spring 18 presses the bearing sleeve (FIG. 5) always against its conical seat, so that any play which may exist is compensated for. This arrangement has above all the advatnage that temperature influences which result from the cutting work are transmitted first of all to the tool and thence to the bearing sleeve and finally to the tool holder 1, and can no longer act on the bearing seat. Therefore, in this construction thermal expansion of the bearing seat need no longer be taken into account and play-free mounting of the bearing sleeve 2 is achieved both in the cold state and also in the hot state. Thus satisfactory clearance and a non-jamming supporting action is always guaranteed with the novel tool mounting arrangement. Any wear which occurs is also completely compensated for by making the lower bearing surface a cone.

In FIG. 4, the lower radial bearing of the bearing sleeve 2b is a cylindrical bearing. This kind of bearing is somewhat cheaper to produce. However, it requires the arrangement of a certain clearance between the bearing sleeve 2b and the tool holder 1a, in order that the bearing sleeve 2b does not become jammed in the tool holder 1a when the said bearing sleeve is subjected to thermal expansion.

As the drawings show, the steel shank 5 or 5a has a relatively wide diameter D and also a relatively considerable bearing contact surface, or in other words a considerable supported length L, in order to obtain satisfactory heat dissipation without additional cooling being required. Since the steel shank 5, 5a is in contact with the bearing sleeve 2 or 2a over the entire peripheral surface of the said shank and over the relatively considerable length L, the considerable cross-section of the steel shank and its large peripheral surface area ($D\pi L$) achieve very good heat dissipation.

The diameter D of the steel shank amounts to at least 45 mm. and can amount to up to about 150 mm., depending on the cutting load or the stroke force of the planning machine. For example, the steel shank has a diameter of about 80 mm. if the cutting load is about 4,000 kg.

As the drawings show, a relatively considerable supported length L is provided which is about twice as great as the diameter D.

I claim:
1. A tool mounting arrangement, particularly for a planing machine which cuts on both forward and reverse strokes, comprising: a tool holder; a tool head movably mounted in the tool holder, said tool head having a cylindrical opening therein; a tool having a cylindrical steel shank and also having a pair of cutting tips at its lower end, said shank extending upwardly into said cylindrical opening in said tool head; conical clamping spring rings arranged around the periphery of the tool shank and disposed within said cylindrical opening; and a clamping ring mounted on the lower end of said tool head for movemet in a direction axially of said cylindrical opening, said clamping ring being engageable with said conical clamping spring rings so that axial movement of said clamping ring moves said conical clamping spring rings into or out of clamping engagement with said tool head and said shank.

2. A tool mounting arrangement according to claim 1, in which the cylindrical opening is closed at its upper end and the upper end face of the cylindrical tool shank has a recess therein for engaging an adjusitng pin provided in the upper end of the cylindrical opening.

3. A tool mounting arrangement according to claim 2, in which the adjusting pin is arranged in a transverse bore in the tool head and engages in a groove provided in the upper end face of the tool shank.

4. A tool mounting arrangement according to claim 3, in which an axial tie bolt extends through the tool shank and is screwed into the tool head and presses the tool shank against the adjusting pin.

5. A tool mounting arrangement according to claim 1, in which the lower end of the tool head has an upwardly tapering bearing cone which is mounted in a corresponding conical seat in the tool holder, a spring mounted between the tool holder and the upper end of the tool head, so that the action of the spring presses the bearing cone into the conical seat and thus the tool head is mounted in play-free manner.

6. A tool mounting arrangement according to claim 1, in which the steel shank is held over its entire circumference in the tool head, and the axial length over which it is held amounts to about twice the shank diameter.

7. A tool mounting arrangement according to claim 1, in which the spring rings have cooperating surfaces which are inclined at a small angle to the axis of the cylindrical opening so that when they are moved axially with respect to each other the distance between their mutually remote circumferential surfaces changes whereby said mutually remote surfaces move into or out of clamping engagement with the wall of said cylindrical opening and the peripheral surface of the shank, respectively.

8. A tool mounting arrangement according to claim 7, in which at least two pairs of spring rings are provided, one pair being adjacent the upper end of the cylindrical opening and the other pair being adjacent the lower end of the cylindrical opening, and a cylindrical spacer between said two pairs of spring rings so that axial movement of the clamping ring actuates both pairs of spring rings.

9. A tool mounting arrangement, particularly for a planing machine which cuts on both forward and reverse strokes, comprising: a tool holder; a tool head movably mounted in the tool holder, said tool head having a conical bore therein; a tool having a conical steel shank and also having a pair of cutting tips at its lower end, said shank extending upwardly into said conical opening and snugly fitting therein; a clamping bolt extending through a longitudinal bore in said tool shank and secured to said tool head for clamping said tool shank in said conical bore; said tool head having a transverse bore in which there is placed an adjusting pin, said pin having a flat extending axially with respect to said bore, said flat engaging in a corresponding recess in the upper end of said tool shank.

10. A tool mounting arrangement according to claim 9, in which the lower end of the tool head has an upwardly tapering bearing cone which is mounted in a correspondingly shaped conical seat in the tool holder, a spring mounted between the tool holder and the upper end of the tool head so that the action of the spring presses the bearing cone into the conical seat and thus the tool head is mounted in play-free manner.

11. A tool mounting arrangement according to claim 9, in which the steel shank is entirely surrounded by the tool head and the axial length of the zone in which it is so surrounded is about twice the diameter of the shank at its widest point.

12. A cutting head for a planing machine which cuts on both forward and reverse strokes, including a tool which has two identical cutting edges and is inserted in a tool head, said tool head being pivotable angularly to a limited extent in a holder wherein said tool head is mounted, the tool consisting of a steel shank which comprises two identical cutting tips at its lower end and is of a circular shape with a relatively large diameter, the tool head being constructed as a cylindrical bearing sleeve into which the tool shank is inserted with the greatest possible bearing contact surface therebetween, the bearing sleeve being closed at its upper end and the upper end face of the cylindrical tool shank having a recess therein for engaging an adjusting pin provided in the upper end of the cylindrical opening.

References Cited in the file of this patent

UNITED STATES PATENTS

| | | |
|---|---|---|
| 2,543,661 | Edlich et al. | Feb. 27, 1951 |
| 2,646,727 | Waldrich | July 28, 1953 |
| 2,940,368 | Walter et al. | June 14, 1960 |

FOREIGN PATENTS

| | | |
|---|---|---|
| 119,506 | Australia | Feb. 15, 1945 |